Aug. 24, 1937.  C. V. HAY  2,091,203
MIRROR
Filed May 11, 1936
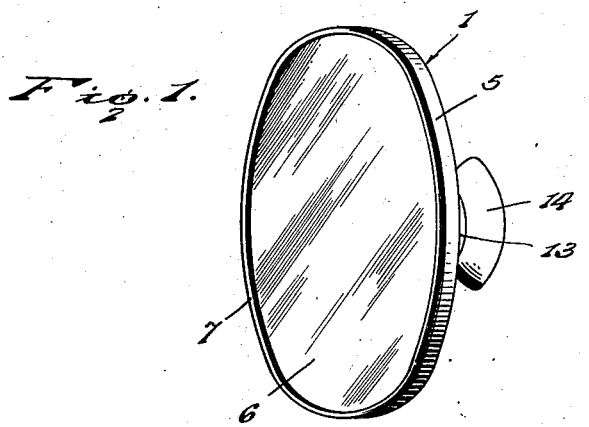
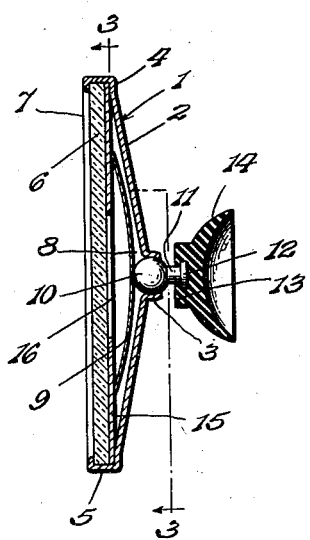
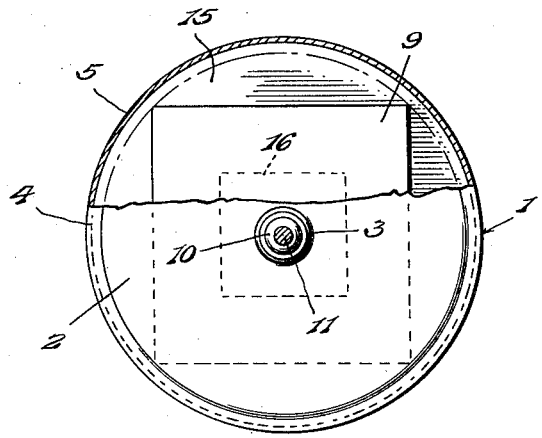
Inventor
Celestina V. Hay.
By Lacey & Lacey,
Attorneys Patented Aug. 24, 1937

2,091,203

UNITED STATES PATENT OFFICE 2,091,203

MIRROR

Celestina Vidal Hay, New York, N. Y.

Application May 11, 1936, Serial No. 79,163

3 Claims. (Cl. 88—97)

This invention relates to a mirror and one object of the invention is to provide a mirror having means associated therewith whereby the mirror may be supported in position for use by applying a suction cup to a flat surface. By this arrangement, the mirror may be very easily supported from any object having a flat surface and, in addition, it may be disposed at any height desired according to whether a person is standing or sitting when using the mirror.

Another object of the invention is to so connect the suction cup with the mirror that the mirror may be tilted until it is disposed at a desired angle where it will be frictionally held and prevented from accidentally moving out of the adjusted position.

Another object of the invention is the provision of a mirror wherein the means for frictionally holding the mirror in an angularly adjusted position is housed in the casing of the mirror where it will be protected and prevented from being tampered with.

Another object of the invention is to provide means for preventing the resilient plate which frictionally holds the mirror in an angularly adjusted position from scratching the coating of reflecting material applied to the glass of the mirror.

The invention is illustrated in the accompanying drawing, wherein

Figure 1 is a perspective view of the improved mirror.

Figure 2 is a sectional view taken vertically through the mirror.

Figure 3 is a view, partially in section and partially in elevation, taken along the line 3—3 of Figure 2.

This mirror has a casing 1 which is preferably formed of metal but may be formed of any material desired. The casing, which is open at its front, has a back 2 which tapers towards its center where the material from which the casing is formed is thrust outwardly to provide a tapered socket 3, as shown in Figure 2. Marginal portions 4 of the back are flattened and carry a rim 5 which surrounds the mirror 6 and is formed with an inwardly extending flange or bead 7 serving to hold the mirror firmly in place within the casing or frame. By forming the frame or casing with a tapered back having a flat marginal portion, the mirror may be firmly held in the casing but a chamber 8 will be defined between the rear or inner face of the mirror and the back of the casing. The chamber 8 accommodates a plate 9 formed of resilient metal having its central portion bearing against the ball 10 and creating frictional binding between the ball and the socket 3. This ball carries a shank 11 which projects from its outer portion and terminates in an enlarged portion 12 embedded in the forwardly projecting thickened portion 13 of a rubber suction cup 14, and, from an inspection of Figure 2, it will be readily understood that when the suction cup is applied to a flat surface, such as a window glass, or a polished surface of a wall or the like, the mirror will be supported from the object to which the cup is applied and disposed at a convenient height. It will also be evident that as the resilient plate creates binding action between the ball 10 and walls of the socket 3, the mirror may be tilted to dispose it at any angle desired and it will remain in the adjusted position. A sheet of cardboard 15, formed with a center opening 16, is placed against the inner or rear face of the mirror 6 so that the sharp marginal edges and corners of the resilient plate 9 will not scratch the reflecting material from the mirror and marginal portions of this protecting sheet extend between the mirror and the flattened marginal portions 4 of the back of the casing so that the protecting sheet will be firmly held in place as well as the mirror. It should be noted that the corners of the resilient plate 9 make contact with the flattened marginal portions 4 of the back, as shown in Figure 3, so that this plate will be prevented from shifting in the compartment 8 out of centered relation to the casing. Therefore, the central portion of the resilient plate will remain in contact with the ball 10 and a very good spring action take place. By curving the plate 9 transversely in one direction, as shown in Figure 2, it may have sufficient give to exert spring action and create the desired binding engagement between the ball and the walls of the socket 3. By having the protecting sheet formed with the center opening, the location of the resilient plate can be observed when assembling the mirror.

Having thus described the invention, what is claimed as new is:

1. A mirror comprising a casing open at its front and having a back tapered towards its center and at its center formed with a socket tapered outwardly, a mirror in said casing between the back and open front thereof, marginal portions of the back being flat, a ball in said socket, a shank projecting from said ball, a suction cup carried by said shank, a resilient plate in the casing between the mirror and the tapered back of the casing, said plate being bowed longitudinally in one direction and having its central portion engaging the ball and portions of its margins contacting with the flattened marginal portions of the back to maintain the plate in centered relation to the casing and mirror, and a protecting sheet for the mirror disposed against the inner face thereof between the mirror and resilient plate with marginal portions of the protecting sheet gripped between the mirror and the flattened marginal portions of the back of the casing.

2. A mirror comprising a casing open at its front and having a back and a circumscribing wall, the back of the casing being formed with a socket, a ball seated in said socket and having a shank projecting rearwardly from the casing, a sheet of resilient material in said casing, said sheet being bowed and having its central portion engaging said ball, a protecting sheet in the casing engaged by marginal portions of the resilient sheet and formed with an opening whereby the resilient sheet may be viewed and properly centered during assemblage, and a mirror in the casing disposed against said protecting sheet with the circumscribing wall of the casing surrounding the mirror and having portions engaging the front face of the mirror to firmly hold the mirror in the casing.

3. A mirror comprising a casing open at its front, a reflector in said casing, portions of the reflector and the back of the casing being spaced from each other to provide a chamber within the casing, a mounting element including a ball mounted for universal movement relative to the back of the casing and having a portion exposed in said chamber, and a bowed sheet of resilient material in said chamber having marginal portions engaging the reflector and portions of the back of the casing to center the resilient sheet in the casing, and an intermediate portion of the resilient sheet being spaced from the reflector and disposed in engagement with the ball to create binding engagement between the ball and the back of the casing.

CELESTINA VIDAL HAY.